(12) United States Patent
Schendel et al.

(10) Patent No.: US 8,999,030 B2
(45) Date of Patent: Apr. 7, 2015

(54) METHODS OF PRODUCING COAL AND FERTILIZERS FROM FERMENTATION RESIDUES

(71) Applicants: Frederick J Schendel, Oakdale, MN (US); Marc von Keitz, Minneapolis, MN (US); Kenneth J Valentas, Golden Valley, MN (US); Steven M Heilmann, Afton, MN (US); Lindsey R Jader, Maplewood, MN (US); Brandon M Wood, Menomonie, WI (US)

(72) Inventors: Frederick J Schendel, Oakdale, MN (US); Marc von Keitz, Minneapolis, MN (US); Kenneth J Valentas, Golden Valley, MN (US); Steven M Heilmann, Afton, MN (US); Lindsey R Jader, Maplewood, MN (US); Brandon M Wood, Menomonie, WI (US)

( * ) Notice: Subject to any disclaimer, the term of this patent is extended or adjusted under 35 U.S.C. 154(b) by 0 days.

(21) Appl. No.: 13/967,523

(22) Filed: Aug. 15, 2013

(65) Prior Publication Data

US 2014/0033777 A1 Feb. 6, 2014

Related U.S. Application Data

(63) Continuation-in-part of application No. 13/565,682, filed on Aug. 2, 2012, now abandoned.

(51) Int. Cl.
*C05B 17/00* (2006.01)
*C10L 5/44* (2006.01)
*C05F 5/00* (2006.01)
*C10L 9/08* (2006.01)
*C05F 11/02* (2006.01)

(52) U.S. Cl.
CPC .............. *C05B 17/00* (2013.01); *C05F 5/008* (2013.01); *C10L 5/447* (2013.01); *C10L 5/44* (2013.01); *C10L 9/086* (2013.01); *C05F 11/02* (2013.01); *Y02E 50/10* (2013.01); *Y02E 50/30* (2013.01); *C10L 2290/543* (2013.01); *C10L 2290/26* (2013.01)

(58) Field of Classification Search
USPC .................................. 422/187; 44/605; 71/23
See application file for complete search history.

(56) References Cited

U.S. PATENT DOCUMENTS

| 4,632,731 A * | 12/1986 | Bodle et al. ................. 201/4 |
| 2011/0016545 A1* | 1/2011 | Gray et al. .................. 800/15 |
| 2013/0046479 A1* | 2/2013 | Rhodes, III .................. 702/19 |

FOREIGN PATENT DOCUMENTS

WO    WO2009048875  A2 *   4/2009

\* cited by examiner

*Primary Examiner* — Prem C Singh
*Assistant Examiner* — Chantel Graham
(74) *Attorney, Agent, or Firm* — Sten Hakanson

(57) ABSTRACT

The present invention concerns a process for producing synthetic coal and aqueous liquid plant fertilizing solution products from a fermentation residue such as is left over from the corn based process of producing ethanol. The synthetic coal has a high heat value commensurate with naturally occurring coals and is lower in ash and sulfur content and thus has value as a clean burning energy source. The aqueous fertilizer includes commercially useful amounts of phosphorous, potassium and nitrogen in solution. The process of the invention is also energy efficient in that the products produced thereby involve the use of substantially less energy as compared to the traditional methods of processing fermentation residues in the corn based ethanol production industry.

6 Claims, 5 Drawing Sheets

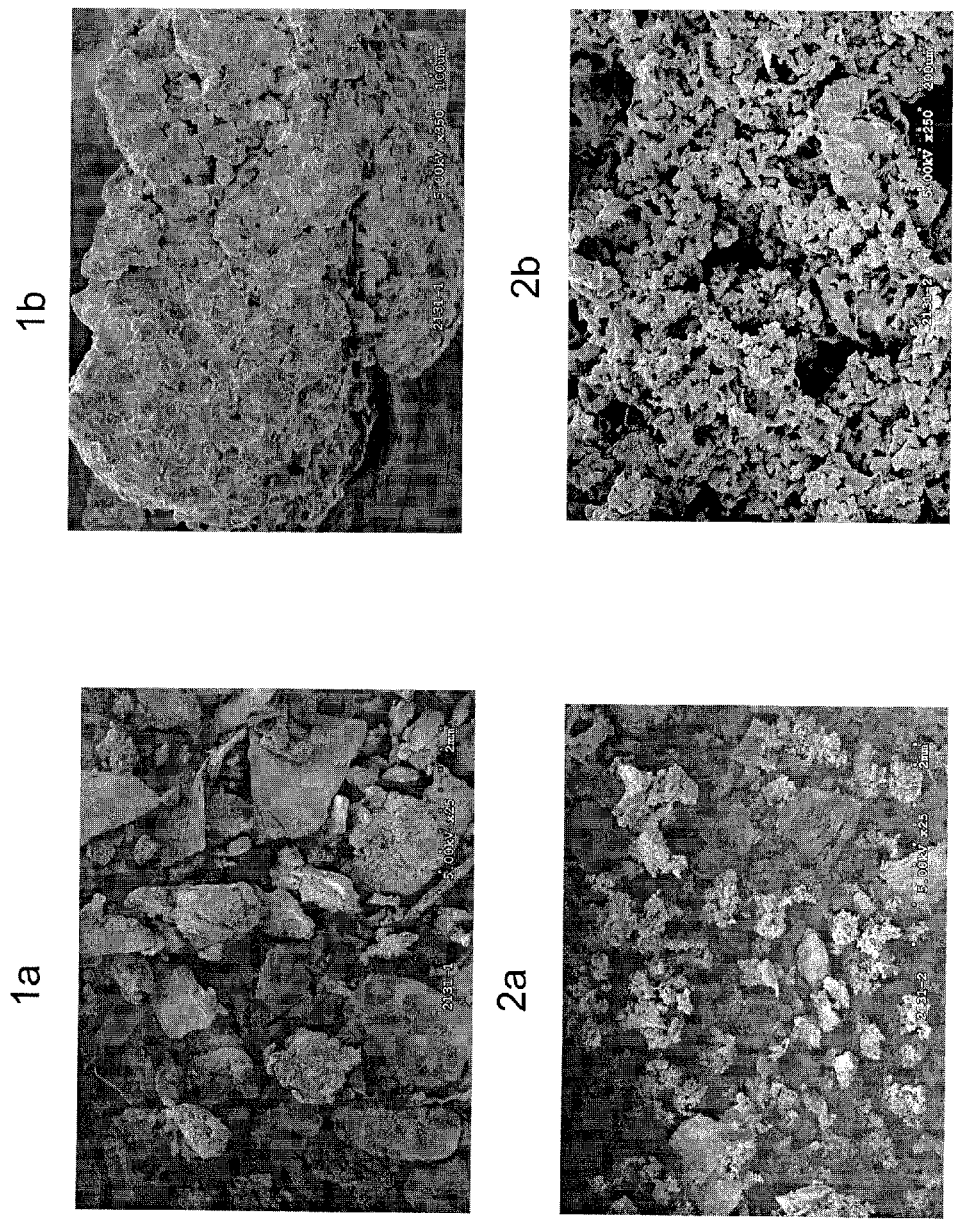

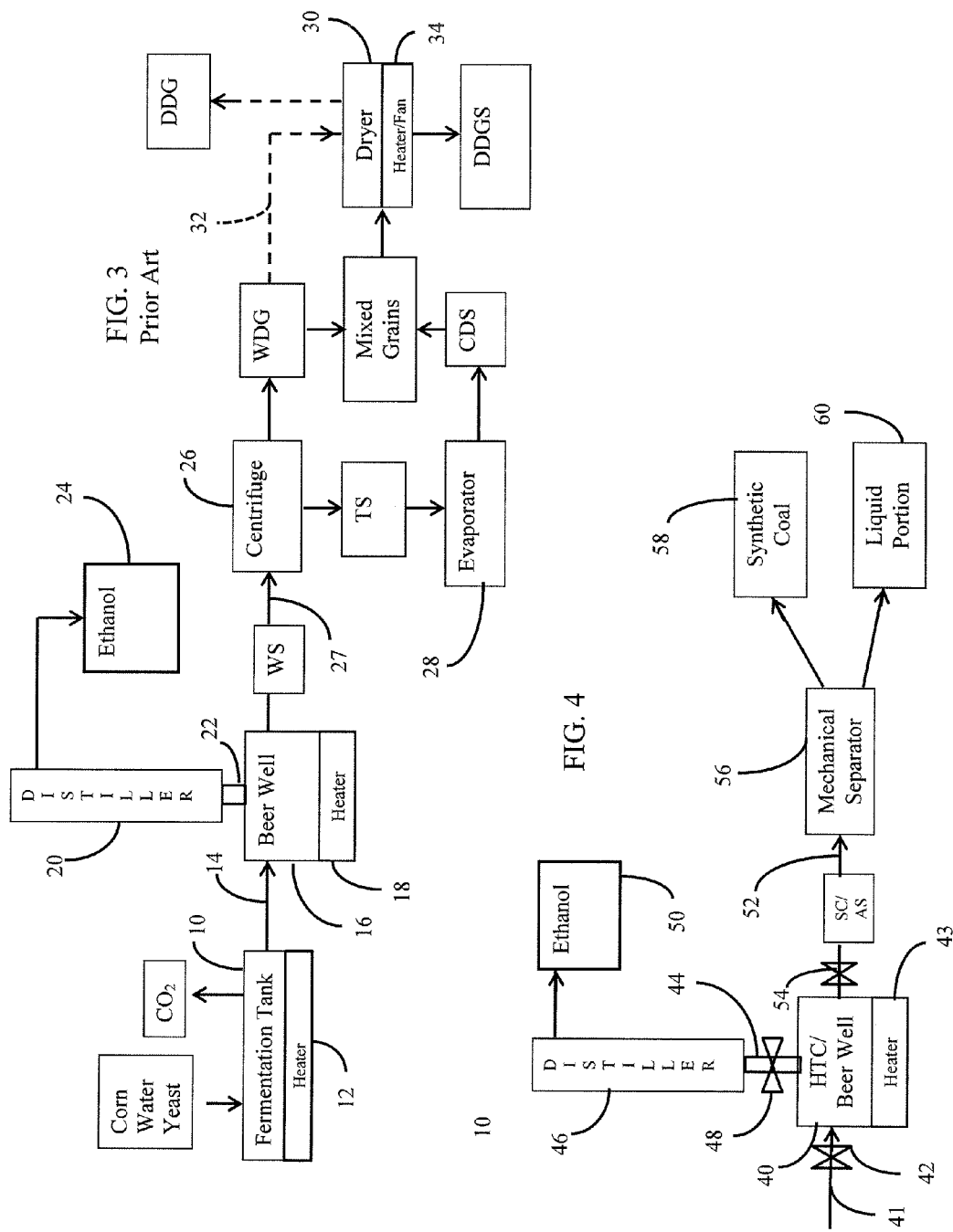

METHODS OF PRODUCING COAL AND FERTILIZERS FROM FERMENTATION RESIDUES

CROSS-REFERENCE TO RELATED APPLICATIONS

This application claims priority to copending U.S. nonprovisional patent application Ser. No. 13/565,682 filed on Aug. 8, 2012 which was a copending continuation of U.S. nonprovisional patent application Ser. No. 12/941,533 filed on Nov. 8, 2010, which was in turn filed based on Provisional application No. 61/258,907 filed on Nov. 6, 2009. The contents of the above mentioned provisional and nonprovisional applications are incorporated herein by reference thereto.

BACKGROUND OF THE INVENTION

Natural coal is generally regarded as a non-renewable energy source in part because of the amount of time needed for the formation thereof to occur naturally. For instance, lignite coal requires millions of years, and anthracite coal requires hundreds of millions of years for its respective formation. The burning of natural coal releases toxic agents, such as heavy metals (e.g., mercury, uranium) co-deposited as part of its sedimentary formation process. Other serious toxic by-products resulting from the burning of coal and other fossil fuels such as oil, gasoline, tar and natural gas include: soot, ash, and oxides of nitrogen, sulfur, and carbon. The release of these toxic chemicals into our atmosphere from the burning of these fossil fuels for the production of energy has resulted in air pollution as well as global warming. Additionally, since fossil fuels are a finite resource and the recovery thereof is becoming more costly as the supplies thereof dwindle, continued reliance thereon will at some point become economically as well as environmentally unfeasible. Also, since a significant amount of crude oil used in the United States is imported, a substantial imbalance in the balance of trade with oil-exporting countries has resulted in severe economic damage to US economy due to the outflow over time of trillions of dollars.

A further environmental problem concerns the need for nitrogen fertilizers for agricultural purposes. Currently, nitrogen fertilizers such as ammonium nitrate and urea require ammonia for their manufacture. Ammonia is chiefly manufactured from nitrogen and hydrogen at high temperature and pressure employing the Haber-Bosch process. While nitrogen can be obtained relatively easily from the atmosphere, hydrogen is obtained by a process known as steam reforming from natural gas. Currently, 5% of the world's annual natural gas is utilized for that purpose. Thus, it would be desirable to generate nitrogen fertilizers without reliance on the use of natural gas.

In response to significantly increased crude oil prices and politically and economically uncomfortable dependence on imports of crude oil, ethanol has been utilized as an additive to gasoline since 1980 and has now commonly reached concentrations of 10% by volume, with 20% by volume being legislated to occur in Minnesota in 2013. Several states also currently offer E85 which contains 85% ethanol and 15% gasoline. A primary advantage of synthetic fuels derived from biomass is that the carbon in them that is released as carbon dioxide into the atmosphere when burned is not newly introduced and additive to the carbon dioxide already present therein. Rather, the released carbon dioxide is recaptured and recycled by plants through photosynthesis resulting in no net addition of that global warming gas to the earth's atmosphere.

The prior art process of producing ethanol and which is representative of how 85% of the ethanol produced in the US is made, can be understood by referring to FIG. 3. As seen therein ethanol, a two carbon alcohol and, to a lesser degree, butanol, a four carbon alcohol, are obtained in the United States primarily by the fermentation in large fermentation vats 10 containing a ground fermentable material. Typically, such material is starch as present in corn kernels, potatoes and other like vegetable materials. Water is added to the fermentable material and enzymes, natural and/or added, are used to breakdown the starch into fermentable dextrins and sugars. Of course, it is also well known to simply start with sugars as obtained, for example, from sugarcane or sugar beets. Yeast is also added to the vat 10 and the mixture is heated by a heater 12 to approximately 37 degrees C. to facilitate the fermentation of the dextrins and sugars producing the ethanol and generating carbon dioxide gas. At the end of the fermentation process the fermented material in vat 10 is pumped along line 14 to a "beer well" 16 which also includes a heater 18. Well 16 is a sealable container and a distillation apparatus 20 is fluidly secured thereto by an outlet conduit 22. The fermented material is then heated by operation of heater 18 to a temperature sufficient to boil the ethanol but not the water, i.e. between approximately 78 and 90 degrees C. As is well understood, the ethanol vapor is then cooled and condensed to liquid form by distillation apparatus 20 and directed to a storage container 24. As is well understood, the resultant ethanol product will contain small amounts of water because water and ethanol form an azeotropic mixture that cannot be separated by distillation. As is also well understood, subsequent processes can be applied such as through the use of molecular sieves for the conversion of the distilled ethanol into absolute or 100% ethanol. After the removal of the ethanol from the fermented material, what remains is a fermentation residue. Those of skill will recognize that the fermentation residue is a highly processed material which differs from the original ground fermentable materials in it is depleted of carbon both from the loss of the carbon dioxide gas during the fermentation step and from the ground fermentable material and the fermented residue as it is further depleted of carbon through the loss of the carbon contained in the ethanol or butanol that is removed from the fermented residue by distillation.

After the removal of the ethanol, the remaining fermentation residue in well 16, referred to as whole stillage (WS), having a dry solids content of about 10-15%, in the dry-grind corn ethanol production industry, is then sent to a centrifuge 26 where it is separated into a solid portion referred to as Wet Distillers Grains (WDG), having a dry solids content of about 35%, and a liquid portion called Thin Stillage (TS), having a dry solids content of 5-10%. TS can be further processed by the evaporation of the water therefrom in evaporator 28 to produce a thick syrup-like portion referred to as Condensed Distillers Solubles (CDS), having a dry solids content of 30-50%. WDG can be sent along a conduit depicted by dashed line 32 directly to a dryer 30 and dried into a shelf-stable animal feed product called Dried Distillers Grains (DDG) by operation of a heater 34 thereof. Alternatively, a shelf-stable animal feed product referred to as Dried Distillers Grains with Solubles (DDGS) can be manufactured. DDGS is typically what is made in the ethanol industry and is obtained by the combining of WDG and CDS, to form a mixed grains material followed by extensive drying of that combination in dryer 30 until the DDGS has a moisture content of less than 10% dry weight and is used as a shelf-stable animal feed product. Although DDG is an acceptable, high quality shelf stable animal feed as well, the DDGS includes additional nutrients present in the CDS. Typically, a bushel of corn can provide 2.8 gallons of ethanol, 18 pounds of DDGS, and 16 pounds of carbon dioxide.

The WDG fermentation residue is comprised of residual fermentable dextrins, yeast, non-fermentable dextrins, protein, fat, low concentrations of metal salts, and water. Often the protein content can be quite high, ca. 30%, and the material is utilized as a high-grade feed especially for ruminants such as cattle, with small amounts able to be employed in feeds for mono-gastric animals such as swine and poultry. WDG can be transported directly to farm sites but only within a relatively small radius, e.g., 30 miles, of the manufacturing site. The limited shipping radius of 30 miles is due to the amount of water present in the WDG which leads to microbial growth that quickly renders it unsuitable for animal consumption.

Unfortunately, and in either case, the physics of the removal of water by heating in dryer 30 requires the input of substantial amounts of energy which adds considerable cost to the production of either DDG or DDGS feed. It is estimated that the intensive drying operations performed on these by-products accounts for 40-45% of the thermal energy and 30-40% of the electrical energy required in the dry-grind ethanol process. In addition, there is also a significant energy cost associated with evaporating the TS and producing CDS. To complicate matters, ethanol manufacturers are often in the situation of having a large surplus of WDG that must be dried at the manufacturing site as there often exists insufficient need for it within the 30 mile radius of their plants. Other fermentation residue stillages that can have similar negative economic and/or waste disposal issues include Brewer's Grains from the production of beer and whiskey, E.-Coli residues from production of antibiotics, and residues from other bacterial, fungal and yeast fermentation processes. As a result, there has been a long felt need for decades to find an economical, energy-efficient and environmentally sustainable solution for obviating the need to dry fermentation residues such as TS and WDG.

This need is particularly pressing for the production of biofuels because it is has been difficult, if not impossible, for the alternative fuel industry to compete on a dollar per gallon basis with the petroleum industry. And specifically, the ethanol industry has been criticized for not being energy efficient, that is, the energy represented by the ethanol being barely greater or even less than the energy needed to produce it, especially when the drying of the TS and WDG are taken into account. However, despite the tremendous pressure to find solutions that would create an economically viable and sustainable alternative fuel industry, results have not been forthcoming.

There also exists a need in the energy resource field for improved synthetic coal products that possess a commercially viable high British Thermal Unit (BTU) per pound content. There further exists a need for nutritive media that can be utilized as plant fertilizers and reduce the consumption of natural gas required in the manufacture of nitrogen fertilizers.

Additionally, there exists a need for innovative processes utilizing natural biological materials as carbon neutral energy resources, thereby not increasing the net amount of carbon dioxide in the atmosphere that utilizing fossil fuels causes.

SUMMARY OF THE INVENTION

The present invention concerns the novel application of a process called Hydro Thermal Carbonization (HTC) to fermentation residues. The fermentation residues are heated in water suspension in a confined system. Two product streams were surprisingly created, a high heat of combustion synthetic coal or char and a nutrient rich liquid aqueous solution. The char product was found to have a heat of combustion commensurate with that of naturally occurring lignite or bituminous coal. This result was surprising given that the fermentation residues used in the present invention represent processed biomass materials that are substantially carbon depleted due to the removal of carbon in the form of carbon dioxide gas and from the removal of ethanol, butanol and/or other fermentation end product or target molecules therefrom, as compared to the naturally occurring unprocessed carbon rich biomass substrates that have heretofore been substrates in HTC processing.

It was also surprisingly found that the aqueous solution remaining after the removal or separation of the synthetic coal of the present invention therefrom has commercially valuable concentrations of fertilizing nutrients such as nitrogen, potassium and phosphorous.

Heretofore, HTC has been limited to the processing of starting materials with a relatively high cellulosic content. Typical starting materials include naturally occurring "woody" substances having a high cellulosic, e.g. 30% or greater, content. In fact, HTC was invented for the purpose of processing wood and wood-like materials into coal. For example, synthetic or artificial coals have been produced from lignocellulosic naturally occurring unprocessed sources, such as wood and peat. Schuhmacher et al., Fuel, 39(3) pp. 223-234 (1960) describes a HTC process involving heating lignocellulosic material in water at temperatures between 225° C. and 390° C. and generally under alkaline conditions to prepare artificial coal-like products. According to this process, gaseous by-products included carbon dioxide, and the residue ("artificial coal") was obtained in decreasing yield with increasing temperature.

Woody (lignocellulosic) plants contain many kinds of cells with specific functions. Cellulose, hemicellulose and lignin are products of specialized cells that provide structural stability and mechanical strength allowing for passage of water and nutrients throughout the various parts of the plant. Antonietti, et al., Chem. Mat. 2007, 19, 4205-4212 and New J. Chem. 2007, 31, 787-789, have subjected various high lignocellulosic containing kinds of terrestrial plant components such as sugar beet chips, pine cones, pine needles, oak leaves, and orange peels to HTC at temperatures from 180-250° C. for periods from 4-24 hours.

There has been one report (Elliot, et. al., Ind. Eng. Chem. Res. 2004, 43:1999-2004) of hydrothermal gasification (with catalyst) conducted with DDGS. The report described subjecting DDGS to 320-360° C. over an expensive Ru/Carbon catalyst in a continuous fixed-bed reactor; wherein the pressure obtained was 21 MPa. The purpose of this operation was to create gaseous products such as methane, hydrogen, ammonia and carbon dioxide. Thus, the reaction conditions employed with the Ru/C catalyst and high reaction temperatures and pressures were designed to create gaseous products, and, as a result, that process was costly, used a considerable amount of energy, and required a complex mechanical/system set up. However, the production of coal and nutritive products from carbon depleted fermentation residues using a low energy HTC process is heretofore unknown.

The present invention provides a coal-like product hereinafter referred to as "coal", "synthetic coal" "char", "hydro-char" or "coal product" in accordance with a specialized HTC process as described in greater detail below. As stated previously, the char/synthetic coal products of the present invention are similar to natural bituminous coal in terms of percent carbon content and energy equivalency, and this was unexpected due to the carbon-depleted, cellulosic and protein contents of fermentation residues. It has further been surprisingly discovered that despite the relatively large particle size of the fermentation residue starting biomass materials, HTC processing can efficiently produce a synthetic coal product in terms of relatively mild reaction temperatures and relatively brief reaction times. Our U.S. Pat. No. 8,414,664, that is incorporated herein by reference thereto, describes HTC processing of microalgae having particle diameters from 1 to 25 micrometers. By contrast, fermentation residues of the present invention have diameters as seen in FIG. 1a that are 1000 times larger. An expectation would be that more severe reaction conditions in terms of temperature and time would be required to convert the larger particle biomass substrate. However, despite the larger particle size it was found that equivalent reaction conditions as described in the '664 patent could be employed with the fermentation residues of the present invention.

The char of the invention can be used as a soil amendment to enhance plant growth, as an energy source, and can also be stored or sequestered in a manner so as to remove the carbon therein from the carbon cycle and thereby help mitigate global warming due to increases in atmospheric carbon dioxide. The synthetic coal product of the present invention may also be useful for the production of industrial chemicals such as methanol, acetic acid and ethylene glycol, as well as preparing hydrocarbon fuels through gasification. The coal or char can also be utilized as a carbonaceous starting material for the production of coke used for the manufacture of steel. The coal/water mixture could also be employed directly into a fuel cell operated at low temperature. The synthetic coals herein can be post-thermally treated to develop higher surface areas and create pore structure for use in higher value applications such as sorbents analogous to activated carbon or as components in biosensors, batteries, and super-capacitors.

Furthermore, the aqueous residue herein remaining after the removal/separation therefrom of the synthetic coal can be used as a nutritive fermentation supplement and as a fertilizer. It has been surprisingly discovered that most of the nitrogen, potassium and phosphorous contents of the fermentation residue processed through the particular HTC conditions of the present invention become transformed into water-soluble compound by-products, rather than being retained in the insoluble synthetic coal product, and these by-products can have separate crop fertilization and other uses.

Additionally, embodiments of the invention provide a hydrothermal carbonization process that increases the carbon-to-oxygen ratio of the resultant synthetic coal product primarily through dehydration rather than by loss of carbon dioxide gas and generates minimal gaseous products. It is important that the amount of carbon dioxide gas released to the atmosphere be minimized with any industrial process to minimize the impact of global warming due to the presence of such gases in the Earth's atmosphere.

The process of the present invention essentially includes the steps of a) obtaining an aqueous fermentation residue; b) subjecting said fermentation residue to hydrothermal carbonization; c) separating the solid char/synthetic coal from its liquid aqueous suspending medium following said hydrothermal carbonization. Those of skill will understand that a major advantage of the process of the present invention is to eliminate the energy intensive drying steps as conventionally applied to a fermentation residue such a WS, TS, mixed grains and WDG. In fact, a further surprising aspect of the present invention under the particular HTC reaction conditions thereof is that the energy required for the HTC process to produce the synthetic coals of the present invention is substantially less than that required to produce DDGS. Furthermore, if the process is conducted with WS directly, the potential exists that the need for the centrifugation unit operation to produce the DDGS or DDG can be completely eliminated, thus saving capital expense and further energy costs.

The char product of the present invention has the following characteristics: a substantially macroporous microstructure or morphology; a substantially higher hydrogen and nitrogen content as compared to bituminous coal and synthetic lignocellulosic coal; and also having low or undetectable elemental sulfur content; a low ash content and, under the same reaction conditions, an equivalent or greater higher heating value (HHV) as compared to the synthetic coal resulting from the HTC of traditional lignocellulosic biomass substrates, and an equivalent HHV to bituminous coal.

The present invention further provides a separated aqueous product comprising an aqueous solution composition including economically useful amounts of phosphorous, potassium and nitrogen that are valuable for use as agricultural fertilizers.

Furthermore, the synthetic coal of the present invention can be used as an energy resource comprising employing said synthetic coal product as a carbon source within a combustive thermal energy generation system. In yet another embodiment, the coal product of the invention can be used in a coal gasification process. In some embodiments, the coal product can be used in a coal gasification process for preparing synthesis gas.

A further advantage of the char product of the present invention is that the employment of a fermentation residue as a starting material to produce synthetic coal provides a carbon-neutral energy source with reduced environmental impact. Additionally, the process herein generates significantly reduced or minimal gaseous output. This is especially the case for carbon dioxide output, since the specific HTC process of the present invention is conducted under reaction conditions that increase the carbon-to-oxygen ratio primarily by loss of water (dehydration) rather than by loss of carbon dioxide. The invention also affords a char product having relatively low sulfur content; low or undetectable levels of toxic metals such as mercury and uranium, and a product with significantly higher nitrogen and hydrogen contents than natural bituminous coal. With the exception of TS and CDS fermentation residue substrates, the synthetic coal embodiments of the invention also contain and produce upon combustion thereof relatively low levels of ash. However, low ash coals can also be obtained from TS and CDS chars by employing an acid wash treatment step after char isolation.

Cumulatively then, the present invention holds the potential to make the production of biofuels from fermented biomass materials a more economically viable and environmentally sustainable industry and serves to reduce or eliminate the negative environmental, health and economic impacts of a continued dependence upon fossil fuels. These and other advantages will become apparent from the following disclosure.

BRIEF DESCRIPTION OF THE DRAWINGS

Embodiments of the invention are illustrated by the following drawings; none of which is intended to be construed as necessarily limiting the invention.

FIGS. 1a and 1b and 2a and 2b are a collection of four scanning electron micrographs (SEMs), at resolutions of 25× ("macro sense" images) for FIGS. 1a and 2a and 300× ("micro sense" images) for FIGS. 1b and 2b. All four images were recorded by employing an accelerating voltage of 5000 volts, with FIGS. 1a and 1b being DDGS starting material and FIGS. 2a and 2b being the resultant coal product as prepared according to the process of the present invention.

FIG. 3 is a diagrammatic depiction of the basic prior art process of producing ethanol and DDGS from corn.

FIG. 4 is a diagrammatic depiction of a process of the present invention and of the novel hardware used therein.

DETAILED DESCRIPTION OF THE INVENTION

Figure 5:
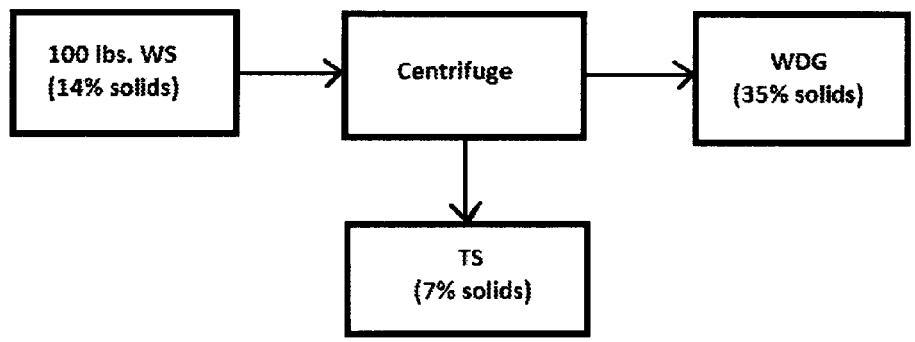
FIG. 5 is a schematic of a depiction of a processing approach using whole stillage and a centrifuge.

As used herein, "fermentation residues" are meant to refer to residues or by-products from various fermentation operations including ethanol production, whiskey and beer production, microbially-assisted antibiotics production, and other bacterial, yeast and fungal fermentation reactions. In association with the dry-grind corn ethanol manufacturing industry, "fermentation residues" also means and includes WS, WDG, DDG, DDGS, TS, CDS and mixed grains.

Examples of fermentation processes which produce fermentation residues include ethanol production from grains, cereal and brewing. Examples of grains which may be used in such fermentation processes resulting in a fermentation residue include corn, wheat, rice, barley and other grains.

The residue produced by the fermentation reactions is the remainder or residue of a fermentation reaction after the specific target material (e.g. biomass, biomaterial such as a protein (e.g. an enzyme), carbohydrate, fat, or small molecule such as ethanol) is removed, by distillation in the case of ethanol, followed by decantation, filtration or centrifugation and other processing unit operations employed in the overall manufacturing process.

The phrase "synthetic coal" is meant to refer to the fact that the synthetic coal-like product was prepared according to embodiments of the invention utilizing fermentation residues as starting material (the term fermentation residues as defined above) and having a relatively low cellulosic content, and which manifests itself as described within this specification and claims.

The term "coal" or "char" as used within the context of the synthetic or artificial output product of the invention is meant to refer to the solid or semi-solid state product outcome corresponding to the fermentation residue starting material after it is treated by the HTC process of the present invention. The term is not meant to necessarily indicate the employment of the product as an ignited energy source, although the ability of such usage is an important aspect of the invention. The term "carbon-neutral" as used herein refers to the achievement of net zero carbon emissions by balancing a measured amount of carbon released with an equivalent amount sequestered through formation of carbohydrates by green plants via photosynthesis.

As used herein, the term "comprising" means the elements recited, or their equivalent in structure or function, plus any other element(s) which are not recited. The terms "having" and "including" are also to be construed as open ended unless the context suggests otherwise. Terms such as "about", "generally", "substantially" and the like are to be construed as modifying a term or value such that it is not an absolute, but does not read on the prior art. Such terms will be defined by the circumstances and the terms that they modify are understood by those of skill in the art. This includes at the very least the degree of expected experimental error, technique error, and instrument error for a given technique used to measure a value.

The term "macroporous" comes from polymer science where it means a material that has pores with sizes ranging from 50 nm-1 μm. For purposes of this invention, the term has been broadened in scope to include materials with surfaces that have channels and crevices of small scale that can be accessed by suspending media such as aqueous solutions. Surface areas of these materials are generally in excess of 2 $m^2/g$.

The present invention provides a process for preparing a fermentation residue-derived synthetic coal product, said process comprising the steps of: obtaining a starting fermentation residue material comprising a fermentation residue-containing aqueous composition; subjecting said starting material to hydrothermal carbonization; filtering the resulting materials to separate a solid synthetic coal material from the aqueous suspending medium; and obtaining separate fermentation residue-derived synthetic coal and aqueous solution products. In some embodiments, the concentration of dry solids in the aqueous fermentation residue may be from between about 5% phw to about 40% phw. In some embodiments, the process further comprises the step of adding an acidic buffer or catalyst to the aqueous suspension prior to the hydrothermal carbonization step. The hydrothermal carbonization process may be performed using a temperature ranging from between about 170° C. and about 225° C., for a duration ranging from a period of about 0.5 hour to about 4 hours, and a pressure up to about 2.41 MPa, for example. However, such pressure is not applied externally to the system but is, rather, what is self-generated or autogenous and primarily due to the vapor pressure of water at the reaction temperature. A solid or semi-solid fermentation residue-derived coal product is obtained, along with an aqueous suspending medium usually in the form of a filtrate composition that can be further downstream processed.

Another important aspect of the process of the invention is that the process conditions reduce or minimize the generation of gaseous products such as carbon dioxide, hydrogen, methane, carbon monoxide, ammonia, and the like. Under conditions employed in various embodiments of the present invention, the amount of carbon dioxide produced during hydrothermal carbonization is less than 10% of the reaction products.

The concentration of the fermentation residue in water is important to the invention. It is believed that particle-to-particle reactions occur and create the agglomerated synthetic coal product of the invention. It was found that starting fermentation residues having high surface areas and agglomeration characteristics can be associated with shorter processing times. In general, the higher particle concentration per unit volume of water, the more agglomeration and bulk mass creation can occur, and a larger yield of the synthetic coal product can be obtained. Thus, the concentration of fermentation residue in the aqueous suspension of the starting material can affect the output quality and yield of the process.

Concentrations of fermentation residues in the starting suspension can be between about 5% to about 50% phw, such as between about 5% to about 30% phw, or between about 5% to about 15% phw. Fermentation operations are conducted in water, and residue concentrations vary depending on the particular microbe and substrate employed. These aqueous suspensions can be utilized as obtained at the concentration or % solids indicated in the previous discussion of FIG. 3 or diluted with water to achieve a desired solids level such that the overall suspension can be moved as a relatively homogenous mass.

While not wishing to be bound by any explanation of a reaction mechanism, it is important to understand especially the behavior of cellulose and proteins under the reaction conditions of the present invention. Cellulose is a crystalline and very recalcitrant biopolymer that is essentially resistant to conditions of the present invention. Bobletter, et al. (Wood Sci Technol 1983; 17:195-202) determined that a temperature of at least 260° C. is required for efficient engagement and hydrolysis of cellulose into glucose and cellobiose that subsequently engage in inter- and intra-molecular dehydrations that result in increasing C:O ratios and char mass formation. Our own efforts ["Hydrothermal carbonization of distillers grains" (Biomass & Bioeng 2011; 35:2526-2533), that is incorporated herein by reference, have also confirmed that cellulose is virtually unaffected and can be recovered unchanged under HTC conditions of the present invention. Therefore, the cellulose content of useful substrates for employing HTC conditions that can be conducted using relatively mild thermal conditions, i.e., less than 225° C., and brief reaction times, i.e., less than about 4 h, that could lead to continuous processing operations is important. The cellulose content of DDGS has been reported to be 16% (Energy & Fuels 2006; 20:2732-2736) and would be expected to be retained within the filtered synthetic coal material essentially unchanged. Similarly, in our previous research article in (Biomass & Bioeng 2011; 35:2526-2533) proteins were found to denature and precipitate, but not undergo carbonization under the HTC conditions of the present invention. That occurred only when carbohydrates and polysaccharides (not cellulose) capable of hydration and subsequent chemical reactions under the reaction conditions and fats were present.

The process of the invention optionally can include the use of buffers or catalysts. Buffers and catalysts can be added into the aqueous mixture prior to proceeding to the hydrothermal carbonization stage. Suitable buffers or catalysts that can be employed in the process include those compounds that afford an acidic pH to the mixture. Polyacidic pH buffers that can be used include, but are not limited to, citric acid and oxalic acid. For example, polyacidic pH buffers which contain significant concentrations of carboxylate (basic) and carboxyl (acidic) functional moieties may be used in embodiments of the invention.

Another important aspect of the invention resides in the process parameters and conditions—particularly relating to temperature and time during hydrothermal carbonization. The process of the invention can be performed at temperatures between about 170° C. and about 225° C., such as between about 190° C. and about 215° C. The process of the invention can be generally performed within a time period of less than about 4 hours. For example, the process can be performed for a duration ranging from between about 0.5 hour up to about 4 hours, or about 0.5 hour to about 2 hours.

In addition to the advantages of relatively low temperature and time parameters and associated reduced energy usage of the process, the pressure conditions generated and corresponding pressure limits required for the process of the invention are also relatively low. The process can be conducted at a pressure of about 2.41 MPa and less, such as between about 0.8 and 2.41 MPa. When a pressure of 2.41 is used, about 90% of the pressure can be attributed to the vapor pressure of water alone at that reaction temperature (220° C. for TS in Example 21).

The hydrothermal carbonization step of the process can be conducted within a pressure-sustaining batch reaction apparatus. Batch reactor apparatuses that can be used include commercially available vessels capable of generating the temperatures (up to about 225° C.) and sustaining the pressure conditions (<2.41 MPa) in aqueous process conditions associated with the invention. Carbonization and dewatering apparatuses similar to that described in Bodle et al. U.S. Pat. No. 4,632,731 can be used, the entire text of which is incorporated herein by reference.

In one embodiment, suitable apparatuses that can be used include those which can conduct a continuous process. For example, the apparatus can include commercially-available twin extruders of stainless steel construction. It is noted that continuous process systems may employ higher temperatures and conduct the process at shorter time periods (e.g., 1 to 5 minutes) and may achieve results similar to batch conditions. Such a system (for lignocellulosic processing) is described in Bobleter et al., J. Appl. Polymer Sci., 20, pp. 2083-2093 (1976).

The invention includes a fermentation residue-derived synthetic coal product having the following characteristics: a substantially macroporous microstructure; a substantially higher hydrogen and nitrogen content as compared to bituminous coal and synthetic coals derived from traditional lignocellulosic substrate used in conventional HTC processes employing reaction conditions of the present invention; a relatively low or undetectable amounts of elemental sulfur content; significantly reduced ash content, or can be rendered a low ash material by treatment with aqueous acid, as with TS and CDS; and a generally equivalent heat of combustion and higher heating value (HHV) as compared to bituminous coal and higher than synthetic coals derived from traditional lignocellulosic substrate used in conventional HTC processes and produced under the HTC temperature/time conditions of the present invention.

For example, the synthetic coal product of the present invention possesses a carbon content greater than 60%; a hydrogen content greater than 6%; a nitrogen content greater than 4%; an elemental sulfur content less than 1%; and an ash content less than1 % by dry weight. The HHV of coals of the invention are in excess of 10,000 BTU/lb.

As stated hereinabove, synthetic coals derived from TS and CDS can also have the quality of low ash content provided such synthetic coals produced therefrom are treated with aqueous acid. These particular fermentation residues possess considerable quantities of metal salts such as chlorides, sulfates, and phosphates of calcium, magnesium, iron and the like. The phosphates in particular are insoluble and believed to be present and suspended in the aqueous media as colloidal, sub-crystalline particles. It is thought that these particles may function as nucleation sites for growing char particles and contribute to char mass. Removal of these salts, however, can be achieved by treatment of the corresponding synthetic coal products with equivalent amounts of strong acids such as hydrochloric or sulfuric acid. Prior to acid treatment, ash contents of TS derived synthetic coals are about 5% and with the more concentrated CDS about 30%.

The coal product possesses a HHV of at least 10,000 BTU/lb. It is noted that in various embodiments of the present invention, the macroporous microstructure of the coal product of the present invention exhibits cavities greater than 50 nanometers in diameter in FIG. 2b. It is further noted that the ash contents of coal products of the present invention, except for those chars mentioned previously, are significantly reduced in comparison to the ash content of their corresponding fermentation residue starting materials or natural coal. In a number of applications of the present invention the ash content has been reduced an order of magnitude compared to the ash content of the starting material. For example, in various embodiments of the present invention, the reduction levels of ash in the coal product of the present invention compared to the ash content of the starting material is >20%, preferably >55%, more preferably >90% reduction. Such a reduction is very important for applications such as conversion into synthesis gas and coal coke replacement.

Embodiments of the invention include methods of using the fermentation residue-derived synthetic coal prepared as described herein as an energy resource comprising employing said fermentation residue-derived synthetic coal product as a carbon source within a combustive thermal energy generation system. Examples of combustive thermal generation systems in which the product of the invention can be employed include, but are not limited to, boiler plus furnace systems, supercritical turbine systems, combined cycle power systems, combined heat and power cogeneration systems, and the like. In addition to the synthetic coal product being separately utilized, the process of the invention can be modified for large industrial scale operation and incorporated as part of a unified combustion thermal generation system with a fossil fuel to reduce the overall amount of "new" carbon dioxide introduced into the atmosphere.

In yet another method, the fermentation residue-derived coal product of the invention can be used in a gasification process. In one embodiment, the coal product of the invention can be used in a steam reforming gasification process for preparing synthesis gas or syngas (a mixture of carbon monoxide and hydrogen gas). Syngas can, in turn, be converted into transportation fuels or industrial chemicals such as methanol, ethylene glycol, acetic acid, and the like. The material can also be utilized to prepare an alternative to coal coke used in the manufacture of steel.

Following the HTC processing of the present invention, the reaction mixture is cooled and the insoluble content of the mixture can be separated in a low energy manner from the water-soluble contents by using filtration. Other low energy/mechanical methods that may be used for separation of the insoluble content include, but are not limited to, decantation and centrifugation. The separated solid or semi-solid component is the synthetic coal product and the remainder is a liquid aqueous filtrate, decantate or centrate.

The fermentation residue-derived synthetic coal product prepared in accordance with the hydrothermal carbonization processes described herein contains chemical and physical attributes unique to the solid or semi-solid product and which are attributable to the particular process steps described herein. The above descriptions for the product and process are both set forth in the above summary of the invention and described in detail within this specification.

Another very significant product of the invention is the aqueous suspending medium obtained as a separated product during a filtration unit operation conducted to separate the synthetic coal from the water-soluble products of the invention. Among the solutes present in the solution are significant concentrations of potassium (K), ammonium (N), and phosphate (P) ions that make up the important KNP components of plant fertilizers. This solution is therefore useful in fertilizing terrestrial agricultural crop plants such as corn, soybeans, and wheat. In various embodiments, the solution is generally a concentrate that may be diluted with water prior to application. Development of useful fertilizer alternatives to ammonia based products (urea and ammonium nitrate) is very important to minimize our national consumption of natural gas. At stoichiometric efficiency, $3/8$ of a mole of natural gas is required to make each mole of ammonia, with additional natural gas being required to heat the reaction system to temperature. Reserves of natural gas are important for our national security and are finite.

As seen by referring to FIG. 4, a further advantage of the present invention in terms of a much simplified reaction process and process hardware can be seen. A modified beer well 40 is shown that receives the fermented residue from a fermentation vat 10 (described in FIG. 3) along a conduit 41 and valve 42. Well 40 is modified to comprise a suitable container being robust enough to contain the autogenic pressures required for practicing the HTC process of the present invention. A variable heat output heater 43 is used to provide the lesser temperatures needed to first distill and remove ethanol or other target molecule from the fermented residue therein through use of a distillation apparatus 46. A valve 48 along a conduit 44 can be opened during this distillation step to permit the ethanol vapors to enter distillation apparatus 46 and be condensed therein for accumulation in a tank 50. When all of the ethanol has been extracted, valve 48 can be closed to seal off modified well 40 so that heater 43 can be regulated to a higher temperature commensurate with the HTC process of the present invention to form the synthetic coal and the nutrient enhanced liquid portion of the present invention. When the HTC process is concluded the synthetic coal and liquid portion can flow through conduit 52 as regulated/permitted by valve 54 to a low energy mechanical manner in separator 56 to be separated thereby by means of filtration, centrifugation, decantation and the like. The coal and liquid portion can then be stored in containers 58 and 60, respectively.

It can be appreciated that FIG. 4 depicts a novel method and apparatus for application in the fermenting industry wherein the beer well is simply a container designed in conjunction with a distillation apparatus to permit both the distillation step and the HTC process step to take place using the same container. Such an approach saves the cost of extra capital equipment, reduces throughput time, and greatly lessens the energy required compared to a process that includes the drying of WDG and/or the evaporation of TS to produce an animal feed. Those of skill will appreciate that the process and process structure as depicted in FIG. 4 can be utilized in existing ethanol plants by adding a suitable HTC condition-tolerant container in place of or in addition to the existing beer well. Those of skill will appreciate that the existing centrifuge can be used to separate the synthetic coal and liquid portion or to separate WDG and TS should the production of some amount of animal feed still be desirable. Naturally, a newly built ethanol plant could be designed simply to produce the synthetic coal and liquid portion of the present invention according to the process herein thereby greatly reducing initial capital costs.

The invention is further illustrated by the following examples, none of which are intended to be construed as necessarily limiting the claimed invention to the particular embodiments described therein. For each of the examples below, the HTC reactor employed was a 450 mL stirred stainless steel reactor (purchased from Parr Instruments, Inc., Moline, Ill.). Heating methods were of two types: an induction heating system (available from LC Miller, Co., Monterey Park, Calif.) and a resistive heating mantle arrangement (available from Parr Instruments, Inc). Rates of heating varied between the two arrangements, with the inductively heated system achieving the desired temperature more rapidly, but no differences in products were detected with the two methods. Energy analyses of synthetic and actual coal samples were determined by two methods: heat of combustion values are actual experimental combustion values determined at Huffman Laboratories, Inc. (Golden, Colo.) or higher heating values (HHV) were calculated based on elemental compositions. The formula developed by Boie was employed (Fuel technology calculations. Energietechnik; 3:309-316) according to the following equation: HHV (in BTU/lb)=151C+500H+27N+45S−48O in which C, H, N, S, and O are weight percents determined from elemental analyses, with O being determined by difference after subtraction of the ash content. As is apparent to one skilled in the art, the examples that were conducted by rehydrating DDGS samples actually regenerates whole stillage. This was done for research purposes in order to employ accurate and reproducible masses of starting materials. In actual practice of the invention, the starting material may or may not be dried, and the concentration of solid material in an aqueous fermentation residue can be determined and its concentration adjusted accordingly.

EXAMPLES

Example 1

An experiment was conducted to illustrate the efficient transformation of a fermentation residue from DDGS into a high quality coal product comparable to natural bituminous coal. The transformation was conducted by employing DDGS at about 20% solids content in distilled water at a temperature of about 200° C. for a period of about 2 hours in the presence of oxalic acid (2% by weight).

A mixture was prepared by combining DDGS [obtained from Chippewa Valley Ethanol Company (Benton, Minn.)] (46.5 g), distilled water (186 g) and oxalic acid (0.93 g) in a 500 mL round-bottomed flask and shaken vigorously to create a homogeneous suspension. The suspension was then transferred (98% of the mass) into a 450 mL Parr reactor and stirred at 88 rpm. The reactor was heated to a temperature of 200° C. using the rapid induction heating system, with the initial reaction pressure at about 1.72 MPa. After a period of about 2 hours, heating was discontinued and the unit was cooled employing a fan to expedite the cooling process. At ambient temperature, the residual pressure was measured at 0.76 MPa. The reaction product was filtered, and the char product was washed well with water. The freeze-dried char product weighed 18.07 g (40% mass yield based on starting DDGS). Elemental analysis of the char gave the following elemental content amounts: % C=67.0; % H=7.8%; and % N=4.2%.

Images of starting DDGS material and DDGS-derived synthetic coal are shown in FIGS. 1 and 2 respectively. Relatively macroscopic images of the two solids are shown in FIGS. 1a and 2a, with microscopic images seen in FIGS. 1b and 2b. These images demonstrate the drastic changes that occur during the hydrothermal carbonization process. The starting DDGS consists of chunks of various sizes with some approaching 1 mm in cross section. Microscopically, DDGS has an organized, almost cellular, structure appearance. The corresponding synthetic coal made from DDGS, by contrast, is quite different. Components of the DDGS have been liquefied or dissolved during the process and reformed into a solid, almost macroporous network as can be seen from the image on the right (FIG. 2b) for the coal product. From these images and the fact that DDGS starting particles have about 1000× the diameters compared with our earlier referenced work with microalgae, it was surprising to us that the chemical transformations required to form synthetic coal could be accomplished in the same timeframe as our earlier referenced and incorporated research with microalgae and within the same temperature range.

Comparative Example 2

For purposes of illustrating the invention, hydrothermal carbonization of a lignocellulosic material was conducted for purposes of comparison. A monoculture prairie grass identified as "Little Bluestem" [having a lignin content of 20% and a cellulose content that is seasonally variable from 32-36% (J Range Management 1976; 29(4):306-308)] was selected as starting material. A sun and air dried, brown colored sample of the grass was obtained and ground thoroughly into a powder having components with a primarily linear aspect ratio and sizes less than 1 mm which was the approximate size of the DDGS particles in Example 1. The material was then subjected to a reported (Antonietti, et al., Chem. Mater. 2007, 19, 4205-4212) hydrothermal carbonization condition for lignocellulosic materials, i.e., 10% solids, with added oxalic acid, at 200° C. for 17 hours. The freeze-dried brown filtered synthetic coal product was obtained in 57% yield. Elemental analysis of the synthetic coal gave: % C=62.3; % H=5.6; and % N=<0.5%. When the reaction was repeated and the reaction time halved, i.e., 8.5 h, the isolated yield was 70% but the % C in the product was only 59.0%. This experiment illustrates that conversion of lignocellulosic materials using HTC conditions of the present invention results in much lower degrees of carbonization, i.e., increases in % C of synthetic coal relative to that of the starting material. This is largely because cellulose is virtually unaffected under HTC conditions and no increase in carbon content of the cellulose occurs.

The following characterization information was obtained regarding the aqueous solution and its solutes obtained in the 17 h reaction: 1) the % solids of freeze-dried material was 1.28%; 2) elemental analysis gave: % C=44.3; % H=5.2; and % N=not detected; 3) the salt content was 17.3 mM; 4) the pH was 3.38; and 5) the metal analysis was determined using Inductively Coupled Plasma (ICP) analysis that provided the following list of metals:

Lignocellulosic Filtrate Metal Content

TABLE 1

| Content (ppm) | | | | | | | | | | | | |
|---|---|---|---|---|---|---|---|---|---|---|---|---|
| 738 | 688 | 234 | 110 | 102 | 46 | 36 | 22 | 12 | 8 | 6 | 2 | 2 |
| Element | Si | K | Ca | P | Mg | Fe | S | Na | Mn | Ni | B | Ba | Zn |

For purposes of employment as a fertilizer, relatively high concentrations of the elements K, N and P are particularly important. As can be seen from the above table, Si and Ca are among the top three elements present with the lignocellulosic material, and no detectable nitrogen was found in the system. This solution would not be a promising fertilizer solution. In contrast, the results of Example 19 conducted using DDGS yielded an aqueous filtrate that should provide an excellent fertilizing material.

Example 3

This Example teaches that employment of reaction conditions comparable to reported conditions for lignocellulosic materials are not necessary and less efficient than those required for fermentation residues of the invention. The conditions were the same as Example 1 conducted with DDGS except that a 14 h reaction time was employed. The mass yield of char product obtained was virtually unchanged at 39%. Elemental analysis gave: % C=69.2; % H=7.8; and % N=4.4. The increased reaction time of 10 hours gave only a slightly greater level of carbonization (2.2%), but not sufficiently greater to warrant the substantially increased reaction time, and a reaction time that could not be economically employed in a continuous process.

Examples 4-6

These Examples examine multiple DDGS samples of varying composition. The results obtained indicate that DDGS, in general, can be converted efficiently into a high quality coal product, with accompanying aqueous solution byproducts. Samples were obtained from the University of Minnesota Swine Center (Professor Gerald Shurson) and the DDGS web site collection. Three samples were received having the following compositions given in weight percent:

TABLE 2

| ID# | % Fat | % Protein | % Carbohydrate | % Ash |
|---|---|---|---|---|
| SO22 | 8.79 | 29.88 | 57.59 | 3.74 |
| SO37 | 11.34 | 31.34 | 52.32 | 5.00 |
| SO26 | 12.29 | 32.56 | 39.18 | 15.96 |

Each of the DDGS samples was subjected to hydrothermal carbonization at 200° C., 15% solids, 2 h reaction time, and with 2% oxalic acid present. Yields and elemental analyses of freeze-dried synthetic coals were as follows:

TABLE 2.1

| Example | % Yield | % C | % H | % N |
|---|---|---|---|---|
| 4 with SO22 | 42.2 | 66.7 | 7.7 | 3.8 |
| 5 with SO37 | 37.1 | 67.4 | 8.1 | 4.0 |
| 6 with SO26 | 37.2 | 66.6 | 7.8 | 4.1 |

These examples show that despite compositional differences in DDGS samples similar synthetic coals are obtained. This result was surprising from the standpoint that the actual principal reactants in HTC reactions are considered to be carbohydrates, and in samples having a 17-18% carbohydrate range, it was expected to at least see higher degrees of carbonization with sample 5022 having the highest carbohydrate content and that was not the case. From processing and product perspectives, however, this surprising result was very good, since essentially the same synthetic coal can be obtained despite variations in compositions of fermentation residue substrates. This is important if the synthetic coal is to be subsequently converted, for example, by post-thermal treatment into higher value co-products.

Examples 7-18

The following Examples constitute a three-variable, two-level factorial experiment with replicated center points examining the importance and interdependence of reaction temperature, reaction time and concentration of the DDGS. Temperatures examined were: 190, 200, and 210° C.; reaction times: 0.50, 1.25, and 2.00 hours; and % solids levels: 5, 15, and 25% DDG by weight. Water also containing oxalic acid (2.0 wt %) was the HTC medium in all experiments.

TABLE 3

| Example | Temp. (° C.) | Time, h | [DDGS] % Solids | % Yield | Char % C |
|---|---|---|---|---|---|
| 7 | 190 | 0.5 | 5.0 | 31.1 | 61.6 |
| 8 | 190 | 0.5 | 25 | 45.6 | 61.2 |
| 9 | 190 | 2.0 | 5.0 | 31.7 | 65.0 |
| 10 | 190 | 2.0 | 25.0 | 44.4 | 64.3 |
| 11 | 200 | 1.25 | 15.0 | 38.9 | 65.5 |
| 12 | 200 | 1.25 | 15.0 | 39.1 | 66.0 |
| 13 | 200 | 1.25 | 15 | 39.0 | 65.2 |
| 14 | 200 | 1.25 | 15.0 | 39.1 | 65.7 |
| 15 | 210 | 0.5 | 5.0 | 30.2 | 65.2 |
| 16 | 210 | 0.5 | 25.0 | 41.9 | 65.9 |
| 17 | 210 | 2.0 | 5.0 | 30.4 | 67.1 |
| 17 | 210 | 2.0 | 25.0 | 39.6 | 68.1 |

Examples 11-14 are replicate experiments in which standard deviations for % yield and % C were computed to be 0.1 and 0.3, respectively. The data show a strong dependence on % solids, with high % mass yields being achieved at 25% solids at both 190 (Examples 8 and 10) and 210° C. (Examples 16 and 18). Carbonization was favored at higher temperature as evidenced by % C levels being greater at 210° C. at both solids levels at 0.5 h (Examples 15 and 16) compared to those obtained at 190° C. where % C values were reduced by over 4% at the 0.5 h reaction time (Examples 7 and 8). Higher temperatures and longer reaction times were also somewhat deleterious to % yield. Comparison of 2 h reaction times and 25% solids concentrations at 190° C. (Example 10) and 210° C. (Example 18) showed a decrease in % yield of about 5% at the higher temperature. The reaction condition of Example 16 really points toward optimum conditions. In this experiment, the greatest mass of DDGS was converted in the shortest amount of time into a highly carbonized coal obtained in virtually the highest yield observed in the study. This result suggests that possibly shorter reaction times, higher solids and slightly higher reaction temperatures may approach a condition in which batch processing operations can give way to continuous processing operations.

These observations were further confirmed by applying analysis of variance methods (ANOVA) to the data in Examples 7-18.

A linear regression equation was developed from the orthogonal factorial design as set out below.

For % Carbon $y1=65.05+1.78X1+1.32X2+0.08X3$, and

For % Yield $y2=35.08-1.34X1-0.34X2+6.01X3$, where

X1=a dimensionless temperature;
X2=a dimensionless time, and where
X3=a dimensionless % solids From these equations and the sizes of the coefficients therein, it is apparent that % solids is extremely important for % yield but not so important for carbonization (% C). This is an important and desirable result because, within the reaction condition space examined, efficient carbonization of the bulk DDGS material at the highest % solids was achieved regardless of temperature and time.

Example 19

This Example considers the characteristics and utility of the aqueous solution product of the hydrothermal carbonization of DDGS. The aqueous filtrate examined in this example was the combined aqueous filtrates of the designed experiment centerpoint replicates (Examples 11-14). The pH was 4.62 and % solids of the solution was 6.29%. In comparison to Comparative Example 2 with a lignocellulosic substrate, the pH of the DDGS derived filtrate was 17 times more alkaline and closer to a desirable neutral condition, and the solids content was almost 500% greater than that obtained with Little Blue Stem, the lignocellulosic. This is important because, for effective microbial activity in soils, carbon as a reducing agent must be present along with the KNP for a healthy microbial community and an effective plant nutrient material. Elemental analysis of the freeze-dried solute material gave: % C=35.9; % H=6.7; % N=6.9; % P=1.8; and % S=1.5. Corresponding values from the starting DDGS were: % C=48.1; % H=7.1; % N=4.9; % P=0.5; and % S=0.7. ICP analysis of the filtrate solution (diluted 1:50 with deionized water) gave the following values in ppm: K=36, Ca=1, Mg=11, Na=4, Fe=0.4, Zn=0.1, Cu=<0.01, Mo=0.02 and B=0.03. No detectable nitrate ion was recorded, and the ionic nitrogen solutes in the filtrate were almost exclusively ammonium.

In the replicate experiments, 29.4 grams of DDGS (minus 10% residual moisture=26.5 g) gave an average of 11.49 g of coal and 10.69 g of solutes in the aqueous solution.

Carbon Accounting:
  26.5 g DDGS→11.49 g Coal+10.69 g Solutes
  % C=48.1% C=65.5+% C=35.9
  12.75 g C 7.52 g in Coal 3.84 g in Solution
  Net Result=60% of the Carbon in the system was in the synthetic coal and 40% in the aqueous solution.

Nitrogen Accounting:
  26.5 g. DDGS→11.49 g. Coal+10.69 g. Solutes
  % N=4.9→% N=4.1→% N=6.9
  1.3 g. N→0.47 g. N→0.74 g. N=1.21 Total
  Net Result=36% of the Nitrogen in the system was in the synthetic coal and 64% in the aqueous solution.

Phosphorous Accounting:
  26.5 g DDGS→11.49 g. Coal+10.69 g. Solute
  % P=0.5% P=n.d. % P=1.8
  n.d.=not detected
  Net Result=Essentially 100% of the Phosphorus was in the aqueous solution product.

These results indicate that the majorities of nitrogen and phosphorous, as well as a significant concentration of potassium from aforementioned ICP analysis, are located in the aqueous solution and available as nutrients for plants.

Example 21

This example teaches that thin stillage (TS) fermentation residues that are essentially intermediate by-products in the dry-grind ethanol manufacturing process are useful substrates in the invention. Authentic TS was received from Al-corn Clean Fuels (Claremont, Minn.). The % solids was 7.2%, and the fatty acid content, determined by Medallion Laboratories, Inc. (Minneapolis, Minn.), was 17.5%, with a total fat level of 18.32%. Elemental analysis of the freeze-dried starting TS was: % C=44.3, % H=7.9, and % N=2.8. The protein content was determined by the common method of computing % N×6.25, and the corresponding protein level was 17.5%.

TS (255.4 g containing 18.38 g of solid material) was poured into the reactor, stirred at 88 rpm, and heated to 220° C. for 75 minutes. The pressure in the reactor after the reaction period was 2.41 Mpa, which is essentially the vapor pressure of water at 220° C. (2.31 Mpa), and the apparatus was cooled using a fan. When the unit had cooled to ca. 35° C., the reactor was disassembled, and the contents were filtered and the hydrochar was washed thoroughly with distilled water. The moist hydrochar (4.04 g) was freeze-dried to obtain 2.95 grams of dry hydrochar. In accordance with our "Process for Obtaining Oils, Lipids and Lipid-Derived Materials from Low Cellulosic Biomass Materials (Provisional filing on 12 May 2010), which is incorporated by reference, extraction of fatty acids from the hydrochar was accomplished by shaking with eight volumes of methyl t-butyl ether (MTBE) on a rotating shaker for 30 minutes, followed by filtration and washing with an additional three volumes of MTBE. The extracted hydrochar was dried overnight at room temperature at 40° C. and additionally for one hour at <1 Torr. The mass of the dry extracted hydrochar was 1.12 g (6.1% based on starting solids). Removal of the MTBE from the extract to constant weight using a rotary evaporator gave 1.81 g of a black oil (9.8% based on starting solids). IR analysis of the oil was consistent with a fatty acid with broad OH stretching absorptions between 3300-2500 $cm^{-1}$ and strong C=O stretching absorption bands at 1760 $cm^{-1}$. $^1$H-NMR analysis of the extract indicated that fatty acids comprised 84% of the mass of the extract, and the corresponding actual yield of fatty acids was 1.52 g (8.6% based on starting solids). The fatty acid extraction and analysis procedure is also outlined in our published work (Applied Energy 2011; 88(10):3286-3290) and is incorporated by reference. The ash content was determined by Huffman Laboratories to be 5.23%, and the corresponding elemental analyses adjusted for ash content were: % C=65.9; % H=6.5%; % N=6.6; and % O=21. The HHV of the solvent- and acid-extracted char was computed to be 12,371 BTU/lb.

Example 22

Similarly, authentic whole stillage (WS) was received from Al-corn Clean Fuels and had a solids content of 12.0%; fatty acid content of 14.8%; total fat content of 13.42%; and a protein content of 25%. Elemental analysis for the starting WS material was: % C=46.0; % H=7.6; and % N=4.0. Into the reactor were poured 245.5 g of the WS (containing 29.5 g of solid material). This was stirred and heated to 215° C. for 75 minutes. Pressure in the reactor was 2.10 Mpa, and the reaction mixture was cooled to 45° C. before filtration and workup. The solvent-extracted hydrochar mass was 5.24 g (17.8% yield), and the isolated fatty acid extract mass was 4.02 g. The NMR analysis, again, indicated that the fatty acids comprised 84% of the extract, and the % yield of isolated fatty acids was 12.8% based on starting solids. The ash content of whole stillage is neglible at <1%, so the elemental analysis of the char was: % C=65.3; % H=6.5%; % N=5.5%; and % O=22.7. The corresponding HHV for the char was 12,168 BTU/lb.

Example 23

An experiment was conducted to illustrate the efficient transformation of another fermentation residue, condensed distillers solubles (CDS). The transformation occurred employing as-received CDS having 32.72% solids at 200° C. for a period of 1.25 hrs. An aliquot of CDS (232.1 g), received from AL-Corn Clean Fuels (Claremont, Minn.), was transferred into a 450 mL Parr reactor. The reactor was heated to a temperature of 200° C. using an induction heating system, with the initial reaction pressure at 1.72 MPa. After a period of 1.25 hours, heating was discontinued and the unit was cooled employing a fan to expedite the process. At ambient temperature, the reaction product was filtered, and the char product was washed well with water. The freeze-dried char product weighed 20.3 g (26.7% mass yield based on starting CDS). As this point the char was thoroughly washed with acetone to remove sorbed fatty acids from the char, and the resultant acetone-extracted, dried char weighed 11.8 g. This was followed by washing with 3.0 N HCl to remove metal salts and other ash-contributing components. The mass of the final solvent- and acid-treated char was 8.2 g when freeze-dried. Elemental analysis of the solvent- and acid-extracted char gave the following elemental content: % C=63.89; % H=6.38; % N=8.16; % O=21.57. The HHV value was determined to be 12,030 BTU/lb.

Example 24

This example teaches that a significantly improved yield of isolated fatty acids can be achieved when a hydrochar-forming carbohydrate additive is employed to generate an increased mass of sorbing hydrochar. When Example 21 with thin stillage was repeated using 0.1M dextrose as the supporting aqueous medium instead of distilled water, the acetone-extracted hydrochar yield improved from 6.1% to 18.8%, and the corresponding fatty acid yield increased from 47% to 78%.

Examples 25-27

These examples teach that acid treatment of CDS hydrochars can provide essentially a metal salt-free hydrochar. This is important for post-thermal treatment operations that are greatly affected by the presence of various metal salts. The advantage of having a metal-free hydrochar is that specific effects caused by specific metals can be much better understood and reproduced, leading to much better product control for high-value products such as battery components, activated carbon analogs, and super-capacitors. Example 25 discloses the metal content of starting CDS. Example 26 discloses the metal content of the acetone-extracted hydrochar (free of sorbed fatty acids) in Example 23. Example 27 discloses the metal content of the final solvent- and acid-extracted hydrochar of Example 23.

TABLE 4

| Metal Analysis, ppm | | | | | | | | | |
|---|---|---|---|---|---|---|---|---|---|
| Ex. | Al | Ba | Ca | Fe | K | Mg | Mn | Na | P | Si |
| 25 | 60 | 6 | 2039 | 86 | 30300 | 9681 | 44 | 4043 | 23415 | 129000 |
| 26 | 40 | 25 | 6535 | 1020 | 1025 | 34638 | 132 | 349 | 50199 | 11665 |
| 27 | 0 | 0 | 186 | 0 | 354 | 52 | 14 | 245 | 452 | 2288 |

Note with the Example 27 hydrochar the almost complete absence of any metal salts. While not wishing to be bound by any explanation, it is believed that both TS and CDS contain relatively higher salt contents and also in their corresponding hydrochars because most of the metal salts present in the TS ultimately are contained in the centrate from the centrifugation unit operation. It is evident that some metal salts (Ba, Ca, Fe, Mg, Mn, and P) are concentrated in the solvent-extracted hydrochar of Example 26. This is believed to be the case due to P present in the system as phosphate, and the metals listed all form relatively water-insoluble phosphate salts that become entrapped within the growing hydrochar. These entrapped metal phosphate salts are released when strong acid is present due to release of phosphate from the insoluble metal phosphate salt and formation of water-soluble phosphoric acid or mono- or di-protic salts.

Example 28

This example teaches that the principal mode of carbonization occurring during hydrothermal carbonization under the reaction conditions of the invention is by dehydration and that decarboxylation to form carbon dioxide, if occurring at all, is a minor reaction. This was explored by construction of a Van Krevelen Diagram (Van Krevelen D W. Fuel 1950, 29, 269-284). This is a graphical statistical method of analyzing reaction mechanisms that occur during carbonization processes. The method involves determining the H/C and O/C atomic ratios, i.e., weight percent atomic weight, for starting materials and hydrochar products. For this example, the % O values were determined independently at Huffman Laboratories, Inc. (Golden, Colo.) and were 37.1% for starting freeze-dried TS and 17.4% for the hydrochar of Example 21. Corresponding H/C and O/C atomic ratios for starting thin stillage were 7.9 and 2.31, while for the hydrochar were 6.2 and 1.08. When these values were plotted on an X/Y graph depicting H/C as the y axis and O/C as the x axis, a line connecting the two points had a slope of 2.0. This result supports the hypothesis that the principal mode of carbonization is by loss of water (dehydration) and not by loss of carbon dioxide (decarboxylation).

Example 29

This Example compares the heats of combustion, elemental analysis and ash content of starting DDGS with that of coal produced from DDGS (Example 1), a natural coal [Powder River Basin coal obtained from Xcel Energy, Inc. (St. Paul, Minn.)] and a synthetic coal obtained from a lignocellulosic plant source (Comparative Example 2).

TABLE 4

| Sample | Heat of Combustion (BTU's/lb.) | % C | % H | % N | % S | % P | Ash |
|---|---|---|---|---|---|---|---|
| DDGS | 8,652 | 48.1 | 7.1 | 4.9 | 0.7 | 0.5 | 4.1 |
| DDGS Coal | 12,752 | 67.0 | 7.8 | 4.2 | <0.5 | 0.001 | 0.4 |
| Natural Coal | 12,293 | 69.6 | 5.7 | 0.9 | 0.6 | n.d. | 5.6 |
| Synthetic Lignocellulosic Coal | 10,482 | 62.3 | 5.6 | <0.5 | n.d. | n.d. | n.d. | n.d. = not determined

The heat of combustion for the DDGS coal product from Example 1 of the present invention is substantially greater than that for starting DDGS, greater than the synthetic coal obtained from a lignocellulosic plant source (Comparative Example 2) that required 17 hours of heating, and comparable to natural coal. The nitrogen content is elevated in both the DDGS starting material and the coal produced from it, albeit with the majority of the nitrogen in the starting DDGS being "removed" in the filtrate (Example 19). The presence of nitrogen in the synthetic coal can provide useful properties such as anion exchange and even employment as a solid carbon dioxide scavenging material to treat effluent gases from fossil fuel burning facilities. Generally the presence of nitrogen in fuels is regarded as a deleterious characteristic, but nitrogen levels present in the DDGS coal are sufficiently low that normal remediation operations in effect at natural coal burning installations will effectively remove any NOX materials formed during combustion. Ash content of the char has also been substantially reduced compared to starting DDGS and greatly reduced compared to natural coal.

Additionally, an expectation mentioned earlier with regard to the hydrothermal carbonization of DDGS having 16% cellulose was that the cellulose would contribute to the mass of synthetic coal formed but would retain its very low heat of combustion value of only 5,029 BTU/lb [Fuel 1996; 75:1715-

1720]. The synthetic coal of Example 1 whose energy potential is expressed above in the Table was prepared from DDGS (46.5 g, containing 16% cellulose or 7.44 g of cellulose) and was converted into synthetic coal (18.07 g still containing 7.44 g of cellulose).

The synthetic coal possessed a heat of combustion value of 12,752 BTU/lb. Contributions to heat of combustion made by non-cellulosic, actual carbonizing components (18.07−7.44=10.63 g) can be computed in the following manner:

18.07 g of synthetic coal consisted of 7.44 g (or 41%) of synthetic coal mass being cellulose and 10.63 g (59%) of synthetic coal mass of actual carbonized material. Therefore, per pound of synthetic coal:

12,752 BTU/lb=0.41 (5,029 BTU/lb for cellulose)+0.59 (X BTU/lb for carbonized material) and solving for X=18,103 BTU/lb. The heat of combustion of the carbonizing moieties was unexpectedly high, even greater than that of lignocellulosic derived chars and of the highest quality natural coals.

From an energy content perspective, synthetic coals that are useful and substantially improved over the state of the art biomass derived materials are those that are carbonized having % C values greater than 60%. Hydrogen is also a very important energy element and % H values greater than 6% are useful. Similarly, % N values of useful materials should be in excess of 4%. Sulfur would also contribute, often not in a positive way as a clean fuel, but is generally undetected or present in very small amounts in fermentation residue synthetic coals of the invention. Computing the HHV base value for these hypothetical biomass fuels that is exceeded by synthetic coals of the invention, then:

$$HHV = 151C + 500H + 27N - 48O$$

and solving $$HHV = 151(60) + 500(6) + 27(4) - 48(30) = 10,728 \text{ BTU/lb}$$

Synthetic coals of the invention are further characterized as having HHV values >10,000 BTU/lb and are useful as carbon neutral fuels.

Example 30

This example teaches that the energy required to conventionally process whole stillage (WS) and obtain dry distillers grains with solubles (DDGS) as a shelf-stable product having 10% moisture content is considerably higher than that to convert WS into the synthetic coal of the invention. Energy requirements for centrifuging WS and evaporator operation were obtained from K. Rausch and B. Ronald, Appl Biochem & Biotech 2006; 128(1):47-86. The following analysis compares conversion of 100 lbs of WS to DDGS with HTC processing of 100 lbs of WS. The overall result was that HTC processing of WS required only 35% of the total energy, resulting in a 65% energy savings.

Conventional Whole Stillage Processing

As seen by also referring to FIG. 5, the below processing approach uses 100 lb.'s of whole stillage (WS) (14% solids pphw in water) which is centrifuged to obtain thin stillage (TS) (7% solids) and wet distillers grains (WDG) (35% solids).
Assumptions:
Thin Stillage (TS): 7% solids
Whole Stillage (WS): 14% solids
Wet Distillers Grains (WDG): 35% solids
Condensed Distillers Solubles: 35% solids
Dried Distillers Grains and Solubles (DDGS): 90% solids
All WDG is used to produce DDGS
30% of the TS is backset to the front end of the fermentation process
Centrifuge: 3 BTU/$lb_{H2O}$
Evaporator (triple effect): 559 BTU/$lb_{H2O}$
Rotary Dryer: 1500 BTU/$lb_{H2O}$
Material balance: WS=TS+WDG
Solids balance: 0.14WS=0.07TS+0.35WDG
Water balance: 0.86WS=0.93TS+0.65WDG
TS=WS−WDG
0.14WS=0.07(WS−WDG)+0.35WDG
0.14(100 lb.)=0.07(100 lb.)−0.07WDG+0.35WDG
14 lb=7 lb−0.28WDG
7 lb=0.28WDG
WDG=7 lb/0.28=25 lb.
TS=100 lb.−25 lb.=75 lb.
Energy consumed by centrifuge=

$$WS \times \frac{3 \text{ BTU}}{\text{lbH2O}} = 258 \text{ BTU}$$

Figure 6:
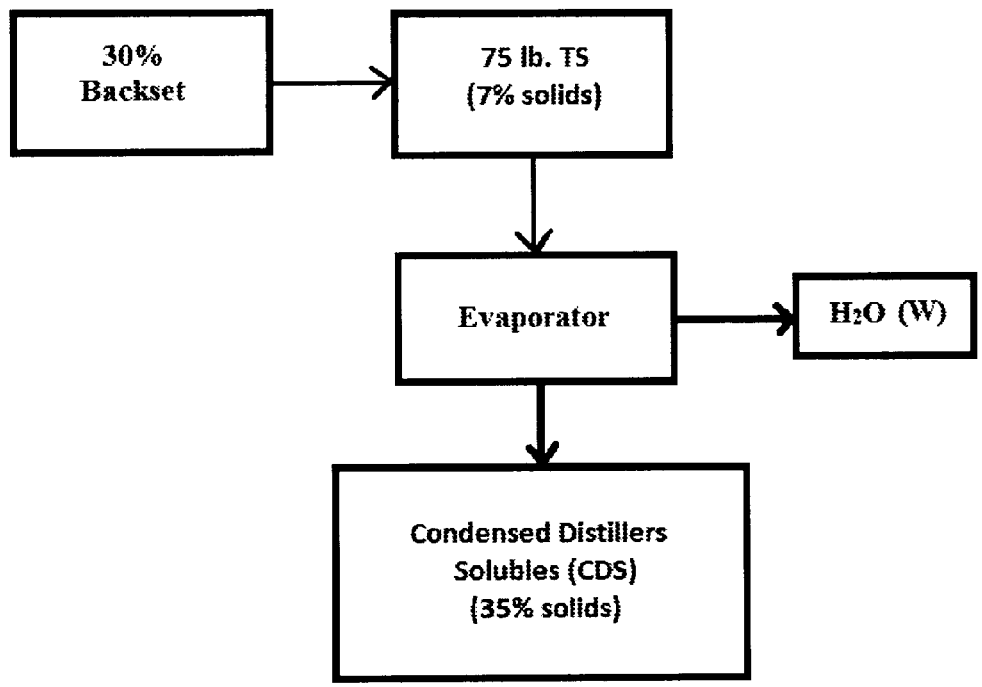
FIG. 6 is a is a schematic of a depiction of a processing approach using backset TS and an evaporator.

As seen by also referring to FIG. 6 relative to the below discussed process, a portion of TS is added back (backset) into fermentation and the remainder is concentrated by the triple effect evaporator to form condensed distillers soluble (CDS) (35% solids).
Material balance: TS=CDS+W
Solids balance: 0.07TS=0.35DS
Water balance: 0.93TS=0.65DS+W
DS=0.07TS/0.35
DS=0.07(52.5 lb.)/0.35=10.5 lb.
W=0.93(52.5 lb.)−0.65(10.5 lb.)=42 lb.
Energy Consumed by Triple Effect Evaporator $$42 \text{ lb}_{H2O} \times \frac{559 \text{ BTU}}{\text{lbH2O}} = 23478 \text{ BTU}$$

Figure 7:
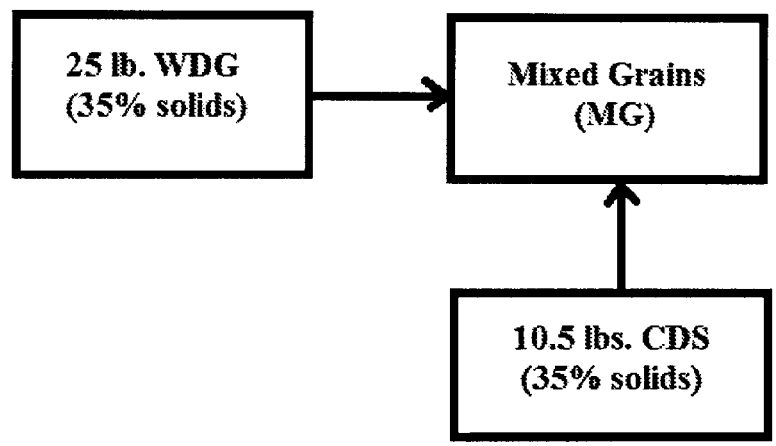
FIG. 7 is a is a schematic of a depiction of a processing approach wherein WDG and CDS are combined.
Figure 8:
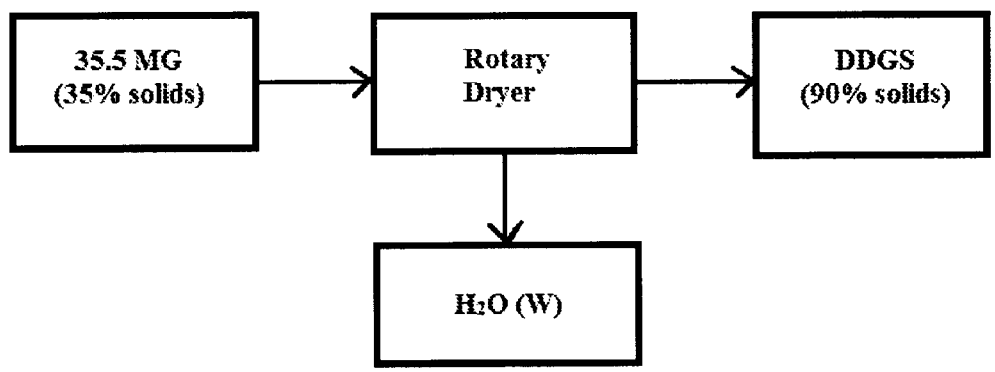
FIG. 8 is a is a schematic of a depiction of a processing approach using a rotary drier.

As also seen by referring to FIG. 7 relative to the below discussed process WDG and CDS are combined.
Material balance: WDG+DS=MG
Solids balance: 0.35WDG+0.35DS=0.35MG
MG=WDG+DS
MG=25 lb.+10.5 lb.=35.5 lb
As also seen by referring to FIG. 8 relative to the below discussed process WDG and CDS are combined to form mixed Grains (MG) which is further rotary evaporator dried to form dried distillers grains with soluble (DDGS) at 90% solids.
Material balance: MG=W+DDGS
Solids balance: 0.35MG=0.90DDGS
Water balance: 0.65MG=0.10DDGS+W
DDGS=0.35MG/0.90
DDGS=0.35(35.5 lb.)/0.90=13.81 lb.
W=0.65MG−0.10DDGS
W=0.65(35.5 lb.)−0.10(13.81 lb.)=21.69 lb.
Energy Consumed by Rotary Dryer $$21.69 \text{ lb}_{H2O} \times \frac{1500 \text{ BTU}}{\text{lbH2O}} = 32535 \text{ BTU}$$

Total Energy
32535 BTU+23478 BTU+258 BTU=56271 BTU $$\frac{56271 \text{ BTU}}{100 \text{ lb. of } WS} = 562.71 \text{ BTU/lb } WS$$

HTC Processing of Whole Stillage

Figure 9:
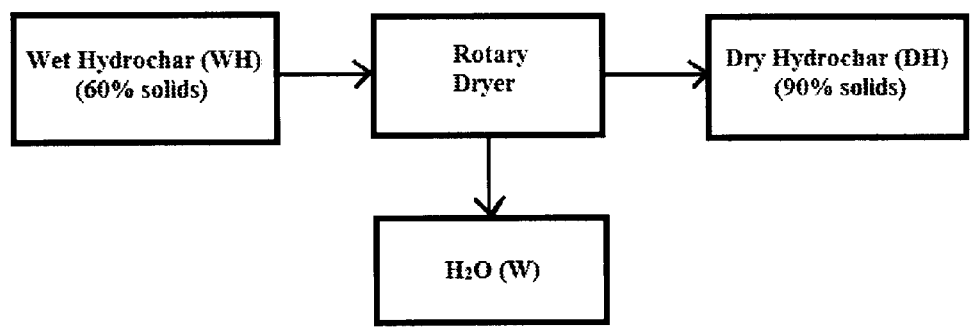
FIG. 9 is a is a schematic of a depiction of a further processing approach using rotary drier.

As also seen by referring to FIG. 9 relative to the below discussed process, HTC is used to provide a moist hydrochar which is isolated by filtration and rotary drum dried to obtain a hydrochar at 90% solids.

Assumptions and Calculations:
Whole Stillage (WS)—14% solids
50% heat recovery through use of heat exchangers
32% mass yield of unextracted hydrochar
Hydrochar—60% solids
Rotary Dryer—1500 BTU/lb$_{H2O}$ $$100 \text{ lb. } WS \times \frac{0.4535 \text{ kg}}{1 \text{ lb.}} = 45.36 \text{ kg } WS$$

$q=mC_p\Delta T$
$q=45.36$ kg (4.3395 kJ/kg ° C.) (200° C.−25° C.)=34446.95 kJ
34446.95 kJ×0.5 (heat recovery)=17223.48 kJ $$17223.48 \text{ kJ} \times \frac{1 \text{ BTU}}{1.055 \text{ kJ}} = 16325.57 \text{ BTU}$$

100 lb. WS×0.14 solids=14 lb. solids
14 lb.×0.32 char yield=4.48 lb. hydrochar
Material balance: WH=W+DH
Solids balance: 0.6WH=0.9DH
Water balance: 0.4WH=W+0.1DH
WH=0.9DH/0.6
WH=0.9(4.48 lb)/0.6=6.72 lb.
W=0.4WH−0.1DH
W=0.4(6.72 lb.)−0.1(4.48 lb.)=2.24 lb. H$_2$O $$2.24 \text{ lb}_{H2O} \times \frac{1500 \text{ BTU}}{\text{lbH2O}} = 3360 \text{ BTU}$$

Total Energy 16325.57 BTU+3360 BTU=19685.57 BTU $$\frac{19685.57 \text{ BTU}}{100 \text{ lb. of } WS} = 196.86 \text{ BTU/lb. } WS$$

The entire texts of patents, publications and other documents referred to herein above are fully incorporated herein by reference. The invention herein above has been described with reference to various and specific embodiments and techniques. It will be understood by one of ordinary skill in the art, however, that reasonable variations and modifications may be made with respect to such embodiments and techniques without substantial departure from either the spirit or scope of the invention defined by the following claims.

What is claimed is:

1. An energy efficient method for processing a fermentation residue into a synthetic coal and aqueous liquid solution products, the method and the synthetic coal and aqueous liquid solution products produced thereby, comprising: heating the fermentation residue in water to a temperature equal to or less than 225 degrees centigrade and equal to or greater than 180 degrees centigrade for a period of time equal to or less than four hours and equal to or greater than 0.5 hours in a confined system, so that the energy used for the entire processing of the fermentation residue is equal to or less than 500 BTU's per pound of dry weight of the initial fermentation residue starting material for producing the synthetic coal and the aqueous liquid solution, separating the synthetic coal from the aqueous liquid solution, and the synthetic coal having a BTU content of at least 10,000 BTUs per pound of dry weight thereof.

2. The method as defined in claim 1 wherein the fermentation residue is that resulting from the dry-grind corn based production of ethanol.

3. The method as defined in claim 1 and wherein the cellulosic content of the fermentation residue is less than 20% by dry weight thereof.

4. The method of claim 1 and the synthetic coal having an ash content less than naturally occurring coal.

5. The method of claim 1 and the synthetic coal having both a nitrogen and hydrogen content greater than naturally occurring coal.

6. The synthetic coal fraction as defined in claim 1 having a carbon value greater than 60%; a hydrogen value greater than 6%; a nitrogen value greater than 4%; a sulfur value less than 1%; and an ash content less than 1%.

\* \* \* \* \*